United States Patent [19]
Nakamura et al.

[11] Patent Number: 6,056,483
[45] Date of Patent: May 2, 2000

[54] POWDER COATING MATERIAL FEEDING APPARATUS

[75] Inventors: Akira Nakamura; Takayuki Eto; Haruhiko Miyazaki, all of Tokyo, Japan

[73] Assignee: Nihon Parkerizing Co., Ltd., Tokyo, Japan

[21] Appl. No.: 08/926,970

[22] Filed: Sep. 10, 1997

[51] Int. Cl.[7] ................................................. B65G 53/40
[52] U.S. Cl. .......................... 406/134; 406/127; 406/138; 406/146; 406/141
[58] Field of Search ................................... 406/127, 134, 406/138, 146, 141

[56] References Cited

U.S. PATENT DOCUMENTS

| | | | |
|---|---|---|---|
| 4,505,623 | 3/1985 | Mulder | 406/134 |
| 4,893,966 | 1/1990 | Roehl | 406/127 |
| 5,335,828 | 8/1994 | Kaiju et al. | 406/138 |
| 5,518,344 | 5/1996 | Miller et al. | 406/134 |
| 5,558,474 | 9/1996 | Wildon | 406/127 |

*Primary Examiner*—Jospeh E. Valenza
*Attorney, Agent, or Firm*—Wenderoth, Lind & Ponack, L.L.P.

[57] ABSTRACT

In a powder coating material feeding apparatus, a lid section is mounted onto an opening of a metal drum containing powder coating material, and a support unit holds the metal drum in its upside-down or tilted position. An air distribution panel supplies carrier air into a conveying hose via a carrier air supply port, opens a pinch valve, activates a vibrator, and supplies fluidizing air into an air chamber in the lid section to fluidize the powder coating material in the metal drum. With this arrangement, the powder coating material is drained into the conveying hose through a drain port in the lower end of the metal drum in its upside-down position, and is then transferred to a powder tank by the carrier air.

6 Claims, 4 Drawing Sheets

POWDER COATING MATERIAL FEEDING APPARATUS

BACKGROUND OF THE INVENTION

1. Field of the Invention

The present invention relates to a powder coating material feeding apparatus and, more particularly, to an apparatus which transfers a powder coating material received in a metal drum from a coating material manufacturer to a powder tank for a powder coating system.

2. Description of the Related Art

Powder coating has drawn attention as an environmentally friendly, pollution-free coating method because it uses no solution. In powder coating, a powder coating material that is sucked through a conveying hose from the powder tank is fed to a powder coating gun, which sprays the powder coating material onto the surface of an object to be coated, and the coating material is thus deposited on the surface of the object.

To continuously perform such a powder coating, the powder coating material has to be continuously or intermittently fed to the powder tank to keep it filled. The powder coating material is typically supplied in a 200-liter metal drum from a manufacture of coating material. Japanese Patent Laid-Open No. 59-74818 discloses a powder transfer apparatus that directly feeds a powder coating material from a metal drum to a powder tank. In this powder transfer apparatus, a nozzle is introduced into the metal drum supported in its fully upright position or tilted position, and an ejector pump connected to the top of the nozzle sucks up the powder coating material. The ejector pump lets compressed air to pass through the top portion of the nozzle to form negative pressure therewithin. With utilizing this negative pressure, the powder coating material is drawn from the tip of the nozzle to the top portion thereof to be fed with the compressed air.

The use of the ejector pump to suck up the powder coating material from within the drum requires a great deal of compressed air. Since the compressed air and the powder coating material are mixed, a cyclone is conventionally used to separate the powder coating material from the compressed air and to feed it to the coating gun. Part of the powder coating material drawn from the drum is thrown away along with the compressed air without being collected at the cyclone, resulting in the deterioration of the utilization efficiency of the coating material.

In the above method in which the ejector pump sucks up the powder coating material by utilizing negative pressure, a feeding rate capacity is 2 kg/min. or so at the highest. In a coating operation requiring a great deal of coating material, such a level of feeding rate is insufficient.

When changing the coating color, the conveying path of the powder coating material has to be cleaned by an air purging or the like, and the cleaning of the nozzle, ejector pump and cyclone is time-consuming.

The use of a great deal of compressed air to transfer the powder coating material possibly causes an impact fusion in which the powder coating material adheres to the inside of the conveying path. The conveying path may be clogged, and an old coating material once adhered to the conveying path is newly transferred and reaches the surface to be coated, thereby degrading coating quality.

SUMMARY OF THE INVENTION

Accordingly, it is an object of the present invention to provide a powder coating material feeding apparatus which accomplishes a high utilization efficiency of coating material and a high feeding rate capacity while facilitating the change of color and preventing the occurrence of impact fusion.

The powder coating material feeding apparatus according to the present invention comprises: a lid section mounted to the opening of a metal drum for closing the opening of the metal drum with a porous plate in which a drain port for the powder coating material is formed; a support unit for holding the metal drum in an upside-down position or a tilted position so that the lid section faces downward; a conveying hose connected to the drain port of the lid section; and an air supply unit for supplying fluidizing air into the metal drum via the porous plate in the lid section to drain the powder coating material through the drain port in the lid section and for supplying carrier air in the conveying hose to transfer the powder coating material.

A pinch valve may be installed in the conveying hose. A vibrator may be installed to the lid section.

DESCRIPTION OF THE PREFERRED EMBODIMENT

Figure 1:
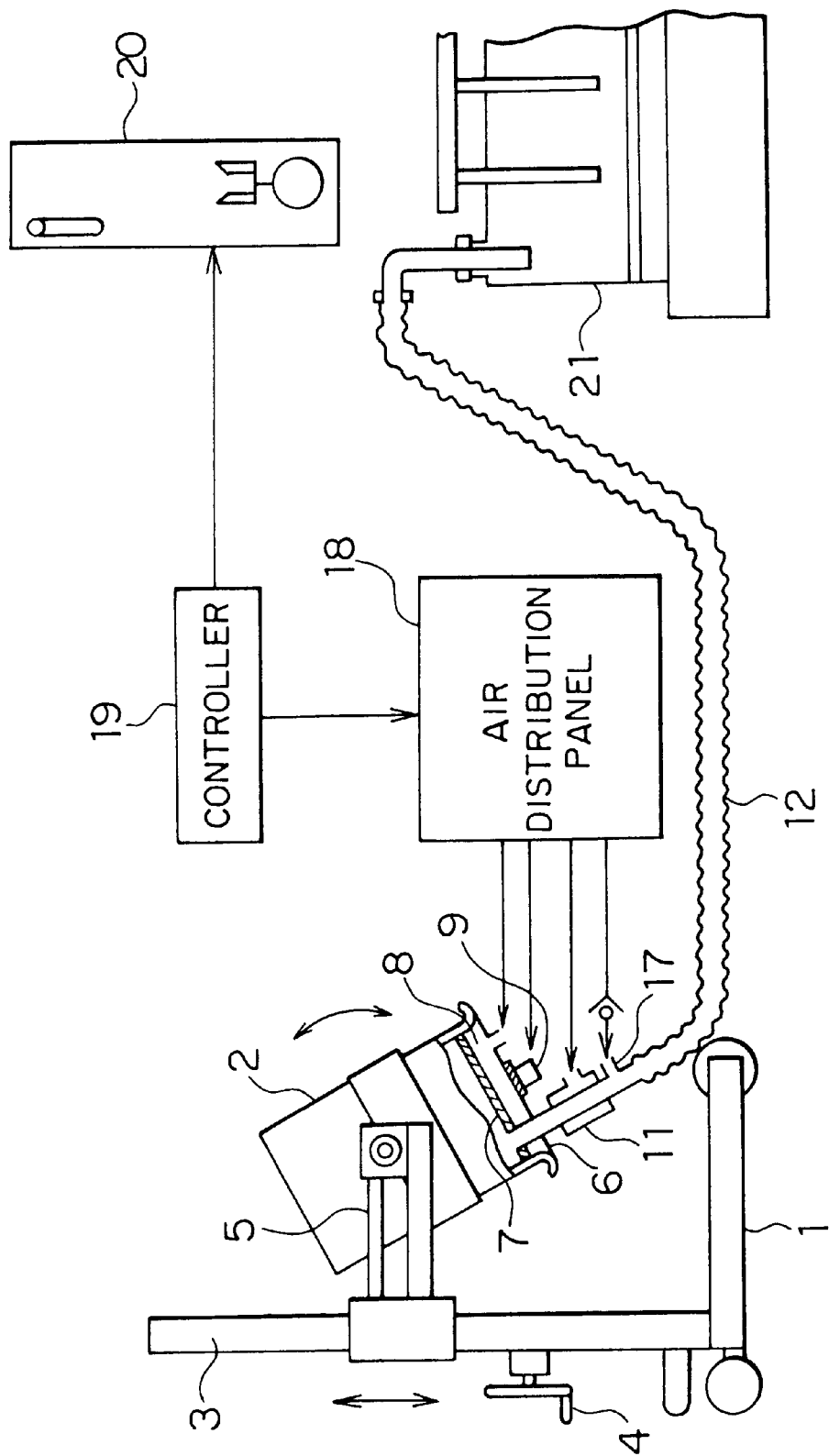
FIG. 1 is a view showing a powder coating material feeding apparatus according to an embodiment of the present invention.

Referring now to the drawings, the embodiment of the present invention will be discussed.

As shown in FIG. 1, a metal drum 2 is supported by a support unit 1 in the powder coating material feeding apparatus according to an embodiment of the present invention. The support unit 1 comprises an upright mast 3, and an arm section 5 for gripping the metal drum 2 which is raised and lowered along the mast 3 by rotating a handle 4. The metal drum 2 gripped by the arm section 5 can be manually pivoted about its horizontal axis to its upside-down position as shown in FIG. 1.

Figure 2:
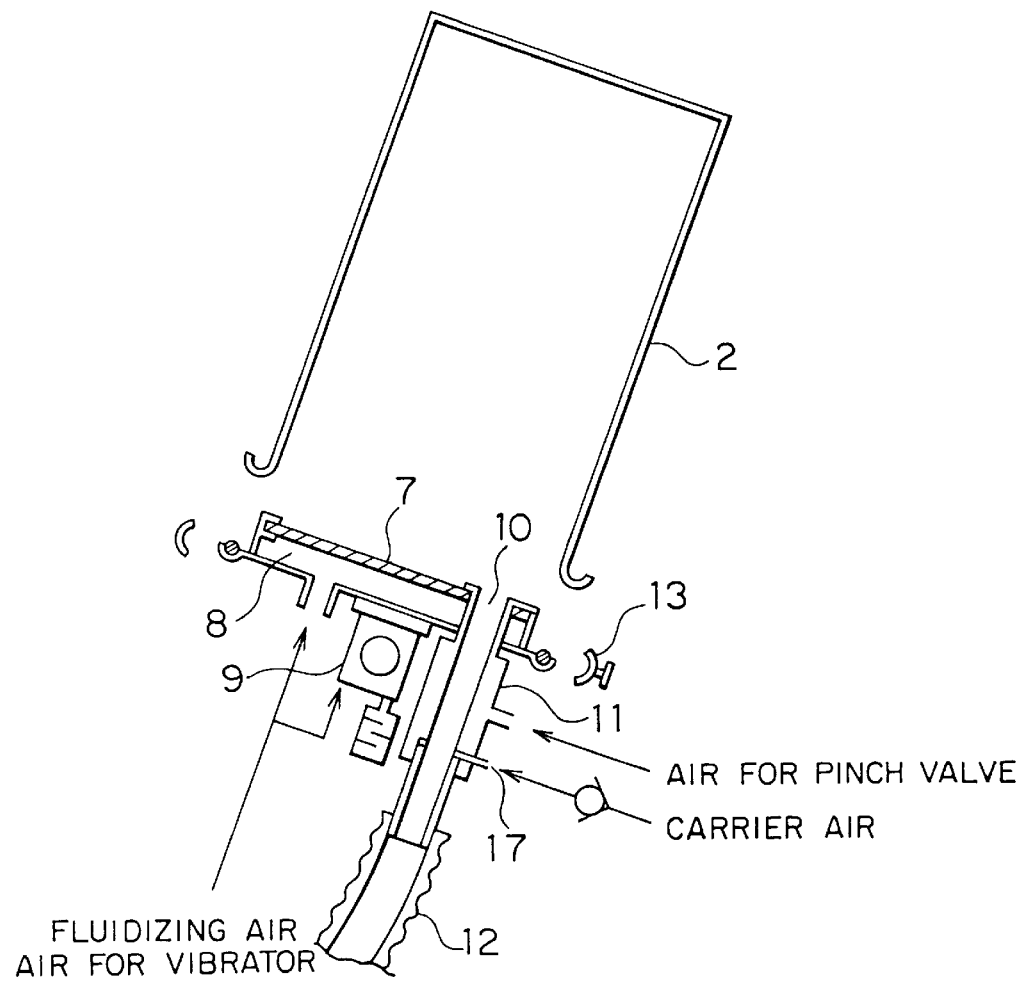
FIG. 2 is a cross-sectional view of a lid section used in the embodiment.

The metal drum 2 has a cylindrical shape having one open end. A powder coating material is supplied in the metal drum 2 with its open end closed with a lid by the manufacturer of the powder coating material. Instead of the original lid, a lid section 6 is attached to the open end of the metal drum. As shown in FIG. 2, the lid section 6 is provided with a circular porous plate 7 having approximately the same diameter as the inner diameter of the metal drum 2. The porous plate 7 comprises numerous pores each of which has a diameter within a range from 5 to 10 μm to allow air to pass therethrough while blocking the powder coating material. The porous plate 7 is made from plastic or sintered metal. An air chamber 8 is formed behind the porous plate 7, and an air-activated vibrator 9 is fixed behind the air chamber 8. A drain port 10 for the powder coating material is formed in the porous plate 7, and one end of a conveying hose 12 is connected to the drain port 10 via a pinch valve 11. A clamp 13 is arranged to fix the lid section 6 to the metal drum 2 with the periphery of the lid section 6 engaged with the circular edge of the open end of the metal drum 2 so that the lid section 6 may not be removed even if the metal drum 2 is in its upside-down position.

Figure 3:
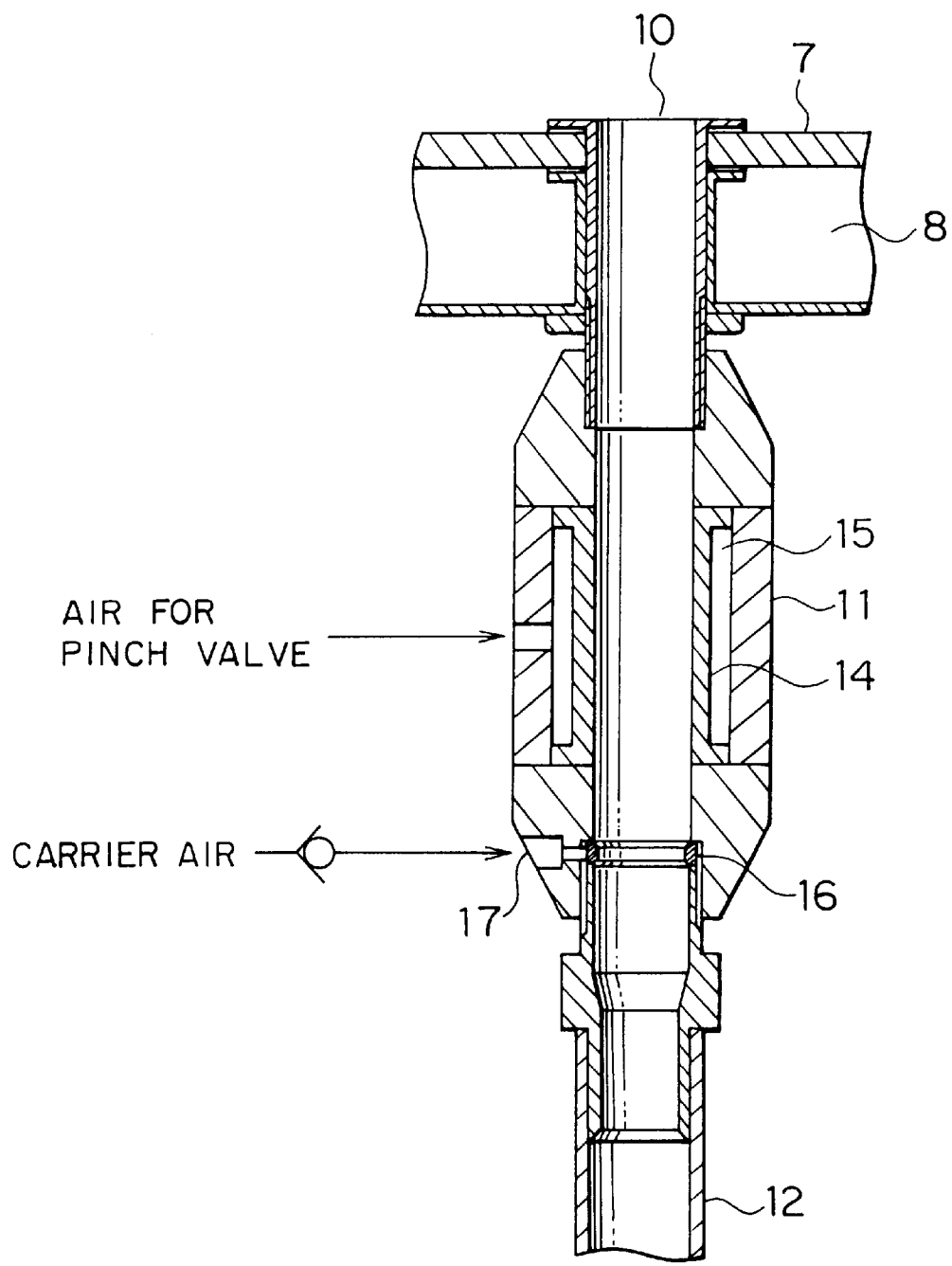
FIG. 3 is an enlarged cross-sectional view showing a major portion of the lid section used in the embodiment.

As shown in FIG. 3, the pinch valve 11 has an elastic cylindrical member 14 made from rubber or the like. The member 14 is sized to have the same inner diameter as that of the drain port 10 and constitutes a part of a conveying path. An air chamber 15 is formed around the elastic member 14. By supplying compressed air into the air chamber 15, the elastic member 14 is deformed to shut the conveying path. Formed downstream of the elastic member 14 is a carrier air supply port 17 for supplying carrier air into the conveying path through a porous ring member 16.

Returning to FIG. 1, an air distribution panel 18 is connected to the air chamber 8 and the vibrator 9 of the lid section 6, the pinch valve 11 and the carrier air supply port 17, respectively, and a controller 19 is connected to the air distribution panel 18. A cleaning unit 20 for cleaning the inside of the conveying hose 12 is connected to the controller 19. The other end of the conveying hose 12 is connected to the powder tank 21 of a coating system.

Figure 4:
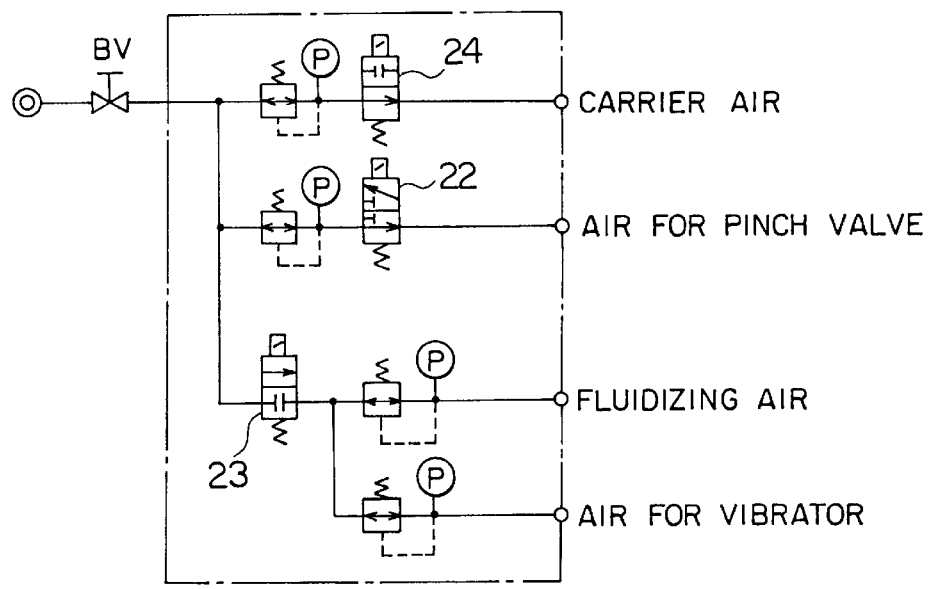
FIG. 4 is an air flow circuit diagram of an air distribution panel used in the embodiment.

The air distribution panel 18 has an air flow circuit shown in FIG. 4. Generally, the pressure of fluidizing air supplied to the air chamber 8 of the lid section 6 is set within a range from 0.5 to 1 kgf/cm$^2$, the pressure of air for vibrator supplied to the vibrator 9 is set within a range from 3 to 5 kgf/cm$^2$, the pressure of air for pinch valve supplied to the pinch valve 11 is set to 3 kgf/cm$^2$, and the pressure of carrier air supplied into the conveying path through the carrier air supply port 17 is set within a range from 1 to 2 kgf/cm$^2$. Used as a solenoid valve 23 for controlling the fluidizing air and the air for vibrator is the one which is opened in an ON state when power is supplied and is closed in an OFF state when power is interrupted. A solenoid valve 22 for controlling the air for pinch valve and a solenoid valve 24 for controlling the carrier air are both closed in an ON state when power is supplied and are opened in an OFF state when power is interrupted. With this arrangement, the conveying hose 12 is prevented from clogging with the powder coating material when the supply of the carrier air stops during a power interruption.

Referring to a timing chart in FIG. 5, the operation of the powder coating material feeding apparatus of the present invention will be discussed. First, the solenoid valves 22 and 23 are initially set in an OFF state while the solenoid valve 24 is set in an ON state, thereby the air for pinch valve being supplied to the pinch valve 11 to shut it off.

A lid of the drum 2 of the powder coating material shipped from the manufacturer is removed and replaced with the lid section 6. The metal drum 2 equipped with the lid section 6 is gripped by the arm section 5 of the support unit 1, and the handle 4 is turned to raise the metal drum 2 along with the arm section 5. When the metal drum 2 is lifted to a height where it can be set in an upside-down position, the metal drum 2 is manually pivoted about the horizontal axis so that the lid section 6 faces downward in its upside-down position or tilted position. When a feeding operation starts at time T1, the controller 19 controls the air distribution panel 18 to turn the solenoid valve 24 to an OFF state, namely to an open state, permitting carrier air to pass through the carrier air supply port 17 and the porous member 16 into the conveying hose 12.

At time T2 after an elapsed time of 15 seconds from time T1, the solenoid valve 22 is turned to an ON state, namely to a closed state, thereby blocking the supply of the air for pinch valve to the pinch valve 11 to open it. At time T3 after an elapsed time of 15 seconds from time T2, the solenoid valve 23 is turned to an ON state, namely to an open state, to supply fluidizing air to the air chamber 8 in the lid section 6 and to supply air for vibrator to the vibrator 9, thereby the entire lid section 6 being vibrated. Fluidizing air supplied to the air chamber 8 is introduced into the metal drum 2 through the numerous pores in the porous plate 7 to fluidize the powder coating material in the metal drum 2 and to supply the powder coating material into the conveying hose 12 through the pinch valve 11 from the drain port 10 in the lower end of the metal drum 2 in its upside-down position. The powder coating material is transferred to the powder tank 21 through the conveying hose 12 by the carrier air.

A feeding rate of approximately 10 kg/min. was obtained when the powder coating material was fed by using the conveying hose 12 of 25 mm diameter.

To terminate the supply of the powder coating material, the solenoid valve 23 is turned to an OFF state at time T4 to stop the supply of the fluidizing air and the air for vibrator. At time T5 after an elapsed time of 15 seconds from time T4, the solenoid valve 22 is turned to an OFF state, thereby supplying air for pinch valve to the pinch valve 11 to shut it. Further, at time T6 after an elapsed time of 15 seconds from time T5, the solenoid valve 24 is turned to an ON state, thereby stopping the supply of carrier air.

When changing the coating color, the metal drum 2 is put back to its upright position after the supply of powder coating material is stopped as described above. The lid section 6 is removed from the metal drum 2, the other end of the conveying hose 12 is inserted into the cleaning unit 20, and the controller 19 drives the cleaning unit 20 to purge the conveying hose 12 with cleaning air. Since the pinch valve 11 connected to the conveying hose 12 and a surrounding area of the drain port 10 are free from complex configurations projected into the conveying path as can be seen from FIG. 3, the powder coating material adhering to the inside of the conveying path can be easily removed. The porous plate 7 in the lid section 6 and its surrounding area are cleaned by air blowing.

After such a cleaning operation, the lid section 6 is mounted to another metal drum 2 containing a powder coating material to be used next and another powder coating operation will be performed.

A sensor, though not shown, for sensing the upper limit level of powder coating material is provided in the powder tank 21. When this sensor senses that the powder tank 21 is full of the powder coating material, the controller 19 stops the feeding of the powder coating material. This stop operation is made in the same manner as that already described referring to the timing chart at time T4 through time T6 shown in FIG. 5. After a predetermined time duration from the time the upper limit level sensor turns OFF, namely, the powder tank 21 is not full, the controller 19 performs the operation according to the timing chart at time T1 through time T3 shown in FIG. 5 to start the feeding of the powder coating material. The controller 19 is provided with a selector switch for start/stop operations of the powder coating material feeding apparatus. This switch is normally set to the start position, in which the feeding of powder coating material is automatically activated in response to the ON/OFF status of the upper limit level sensor.

Figure 5:
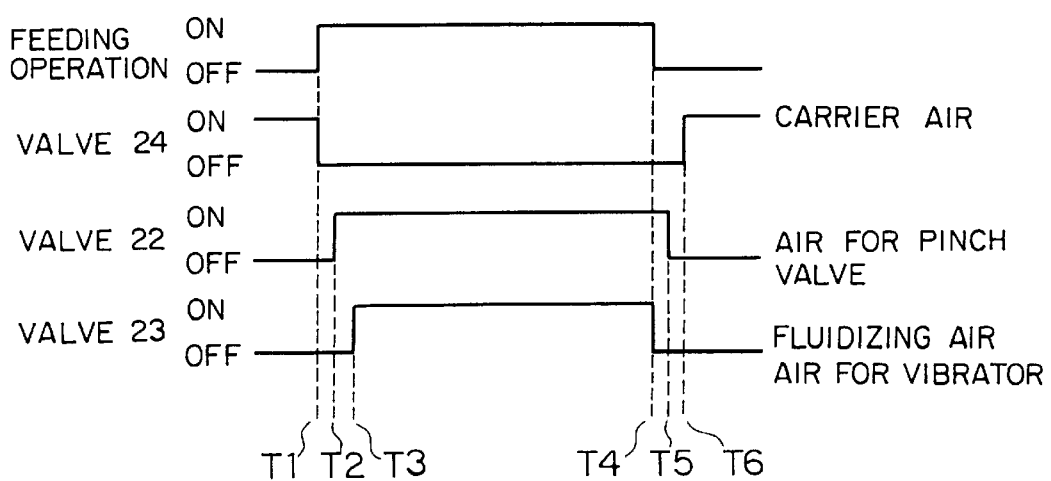
FIG. 5 is a timing chart illustrating the operation of the embodiment.

In the timing chart shown in FIG. 5, time intervals between T1 and T2, and T2 and T3, and time intervals between T4 and T5, and T5 and T6 are set to be 15 seconds. The time intervals are not limited to this, and may be set to any appropriate duration depending on the feeding rate or the like.

Since the present invention uses no cyclone as described above, the utilization efficiency of coating material is improved, the feeding rate is increased, and the change of color of coating is easily performed. The present invention also prevents the clogging of the conveying path arising from impact fusion and the degradation of coating quality.

What is claimed is:

1. A powder coating material feeding apparatus for feeding a powder coating material contained in a metal drum, comprising:
   a lid section mounted to the opening of a metal drum for closing the opening of the metal drum with a porous plate in which a drain port for the powder coating material is formed;
   a support unit for holding the metal drum in an upside-down position or a tilted position so that the lid section faces downward;
   a conveying hose connected to the drain port of the lid section; and
   an air supply unit for supplying fluidizing air into the metal drum via the porous plate in the lid section to drain the powder coating material through the drain port in the lid section and for supplying carrier air in the conveying hose to transfer the powder coating material.

2. A powder coating material feeding apparatus according to claim 1 further comprising a pinch valve installed in the conveying hose.

3. A powder coating material feeding apparatus according to claim 2 wherein the pinch valve is opened and closed by air supplied from the air supply unit.

4. A powder coating material feeding apparatus according to claim 1 wherein the lid section comprises a vibrator.

5. A powder coating material feeding apparatus according to claim 4 wherein the vibrator is activated by air supplied from the air supply unit.

6. A powder coating material feeding apparatus according to claim 1 further comprising a clamp for fixing the lid section to the opening of the metal drum.

* * * * *